Nov. 1, 1955 — M. ENGLER — 2,722,590
TUBE JOINING APPARATUS
Filed June 12, 1951 — 2 Sheets-Sheet 1
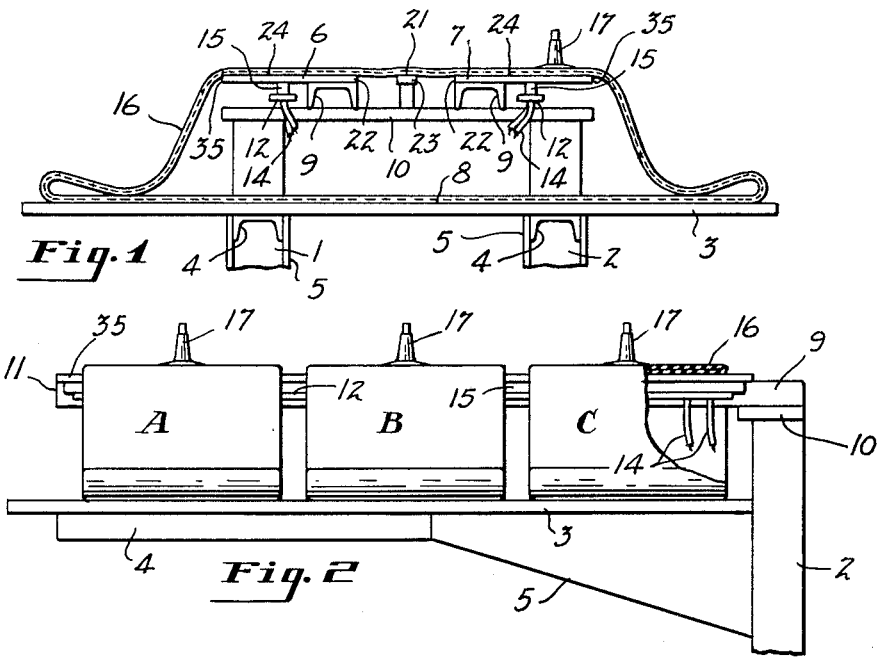
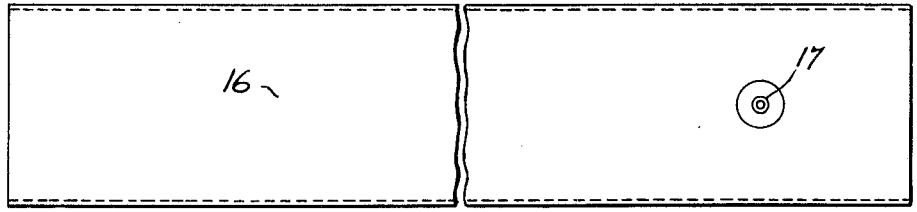
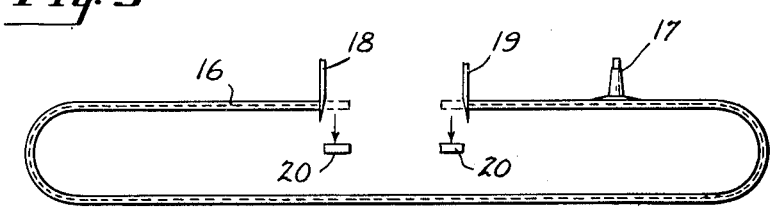
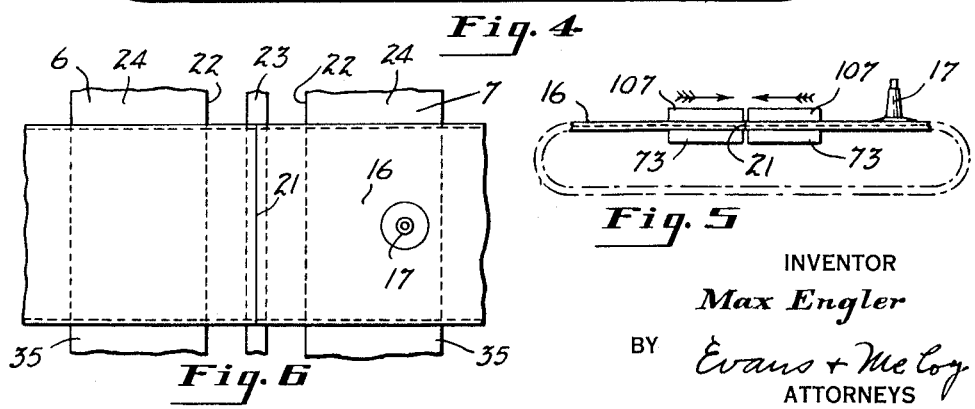
INVENTOR
*Max Engler*
BY *Evans + McCoy*
ATTORNEYS Nov. 1, 1955  M. ENGLER  2,722,590
TUBE JOINING APPARATUS
Filed June 12, 1951  2 Sheets-Sheet 2
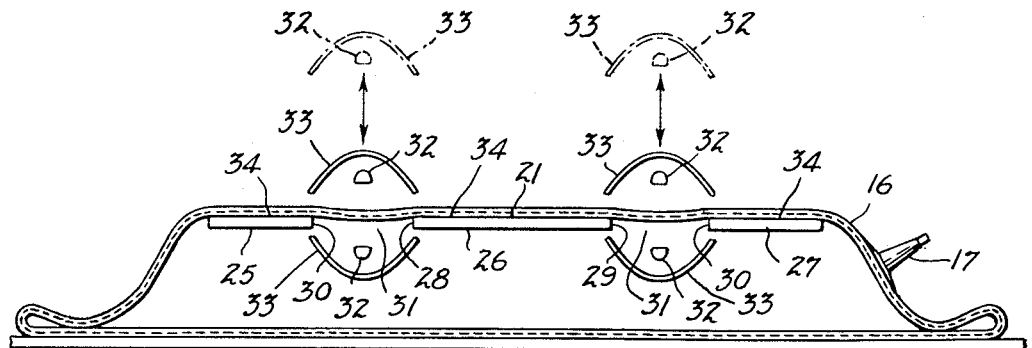
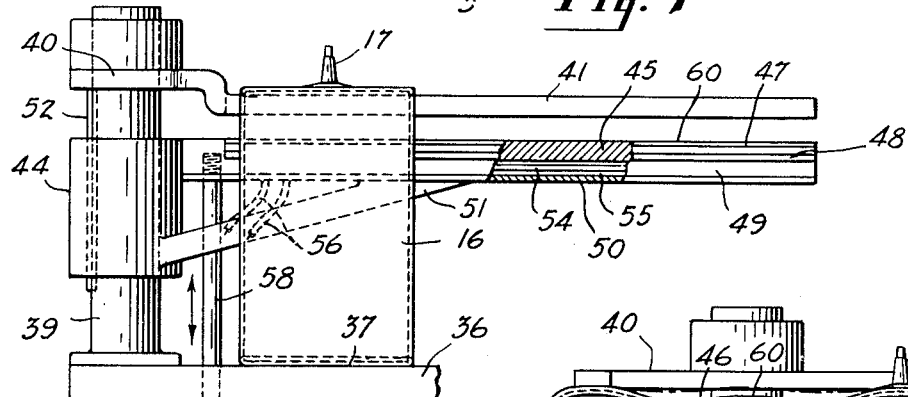
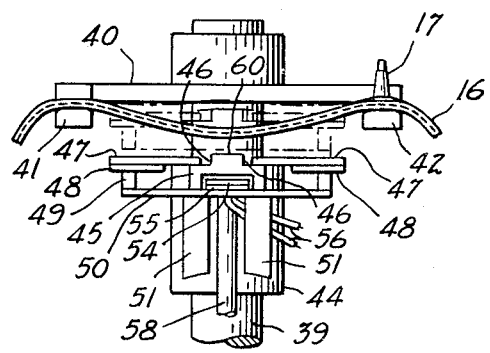
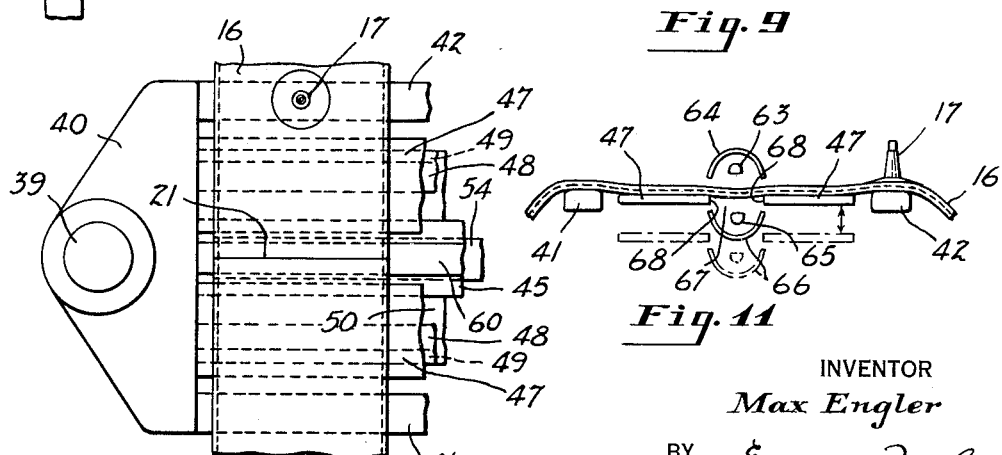
INVENTOR
Max Engler
BY Evans & McCoy
ATTORNEYS United States Patent Office 2,722,590
Patented Nov. 1, 1955

2,722,590

TUBE JOINING APPARATUS

Max Engler, Akron, Ohio, assignor to The General Tire and Rubber Company, Akron, Ohio, a corporation of Ohio Application June 12, 1951, Serial No. 231,237

3 Claims. (Cl. 219—19)

This invention relates to the art of joining the ends of tubular rubber stock. It is more particularly concerned with the provision of improvements in the process of and apparatus for making endless rubber tubes such as the inflatable inner tubes used in pneumatic vehicle tires. The present method is intended as an adjunct of an otherwise conventional process for making vehicle tire inner tubes in which tubular stock in raw or partly cured condition is cut into lengths, the ends abutted and pressed together to form an annulus, and the annulus so formed is inflated in a heated mold for curing. Apparatus useful in the cutting of the tubular stock and in joining the freshly severed ends is disclosed in U. S. Patent 2,186,286 issued January 9, 1940. Modifications have been evolved in the method and apparatus referred to, particularly with respect to the timing of the cycle for joining the tube ends in adapting the process to tubes of synthetic or butyl rubber. Difficulty is experienced in the molding or curing, even with the relatively long dwell periods now commonly used in holding the abutted tube ends together during the joining operation. The joined together ends too frequently become separated after the tube has been placed in the curing mold, resulting in what is known as a "blow" tube. The tube ends, when joined by conventional methods in which the ends are simply abutted under pressure, and particularly in cases of tubes of synthetic rubber, do not retain sufficiently strong joints to withstand the tensile forces to which the tubes are subjected when inflated within the mold. It is apparent that when the tube is inflated in the curing mold those portions of the annular tube which constitute the outer circumference of the finished inner tube are subjected to a greater stretching or circumferential elongation than are those portions which constitute the inner circumference of the annular tube. The failure of tubes during the molding or curing process thus occurs more frequently along that portion of the abutment seam disposed at the outer circumference of the tube than along the seam portion on the inner circumference.

The improper curing that results from a "blown" tube has previously been recognized and attempts have been made to overcome the difficulty. Apparatus for increasing the strength of the seam or joint is described in copending application for patent Serial No. 185,640, filed September 19, 1950, and in U. S. Patent 2,534,252, issued December 19, 1950.

The present invention has for one of its principal objects the provision of a generally improved method and apparauts for heat treating tubular stock having pressure joined ends so as to effect a relative increase in the strength of the seam or joint over the strength of adjacent tube portions. As a specialized version of the invention, it is sought to provide such a process and apparatus for use immediately prior to conventional molding in connection with the making of annular inner tubes for vehicle tires with a view to reducing seam failures along those portions of the abutment seams which are disposed at or adjacent the outer circumferences of the tubes when the latter are inflated in the curing molds.

Another object is to provide improvements in the method of and apparatus for making vehicle tire inner tubes of such character that the improvements can be adopted and used with conventional equipment and processes and without drastic changes or modifications. A further object is to provide an improved method and apparatus of the character mentioned wherein an annular rubber tube having an abutment seam is relatively increased in strength over that portion of the tube which includes the seam or abutment joint by heating a circumferentially short section of the tube. The relative increase in tube strength at the seam prevents failure of the seam when the tube is inflated in the curing mold since a relatively greater distention or expansion of other portions of the tube occurs during inflation.

In its broader aspects, the invention contemplates the direct application of heat to only a circumferentially short section of the rubber tube at or adjacent the abutment seam to soften or partially cure such short tube portion. In a preferred arrangement the tube is heated in a zone or zones spaced circumferentially from the tube seam, the heat being applied for only a relatively short period of time insufficient to cure the rubber so heated but sufficient to soften the rubber so that when placed in the curing mold, preferably immediately after the completion of the auxiliary heating step, the circumferential stretching incident to tube inflation is largely concentrated in the heated portion or portions, these portions being less resistant to stretching than the unheated portion that includes the joint or seam, thereby relieving the latter portion of inflation stresses.

According to another aspect of the invention, localized heat is applied in a preliminary curing operation only to that portion, relatively short circumferentially, which contains the seam or splice. This heating of the circumferentially short seam containing portion effects a partial cure of the rubber at the seam thereby relatively increasing the seam strength. When the tube is subsequently inflated in the curing mold the seam has such strength that failure or parting of the seam under the tension of inflation is substantially eliminated.

These and other objects and advantages of the invention will become apparent from the following more detailed description made in connection with the accompanying drawings forming a part of the specification.

In the drawings:

Figure 1 is an elevational view, with parts removed, of apparatus for localized heating of spaced, circumferentially short portions of inner tubes, this view showing tubes in heating position on the apparatus;

Fig. 2 is a side elevational view of the apparatus and tubes of Fig. 1, this view also having parts broken away and removed, and having a portion of one of the tubes cut away to show the tube in section;

Figs. 3 through 6 are diagrammatic views showing successive stages in the manufacture of an endless inner tube for vehicle tires in accordance with the principles of the present invention;

Fig. 7 is an elevational view, partly diagrammatic, showing a modified form of apparatus with a tube in position for heating, this view corresponding to Fig. 1 of the embodiment illustrated in Figs. 1 and 2;

Fig. 8 is a side elevational view, partly in section and with parts broken away and removed, of another modified form of apparatus showing an inner tube in heating position;

Fig. 9 is a fragmentary front elevational detail of the apparatus of Fig. 8, this view showing the relationship between the tube and the heater assembly when the latter is withdrawn from heating position;

Fig. 10 is a fragmentary plan view, with parts broken away and removed, showing the apparatus and inner tube of Figs. 8 and 9; and Fig. 11 is a fragmentary front elevational view, partly diagrammatic, of still another modification of the apparatus, this view corresponding to Fig. 9 of the modification shown in Figs. 8 through 10.

The method of the present invention is used in conjunction with otherwise conventional practice followed in the manufacture of vehicle tire molded inner tubes. The process calls for localized heating of the uncured rubber annulus prior to placing of the annulus in the heated mold for shaping and curing. It is thus convenient to locate the apparatus of the present invention immediately adjacent the mold used in the tube curing or vulcanizing step. This location of the present apparatus in close proximity to the curing mold or molds permits the preheated tubes to be placed in the curing mold immediately upon removal from the preheater and while the locally heated portion or portions of the tube are at an elevated temperature.

The present apparatus includes a suitable pedestal or supporting structure having uprights or vertical members 1 and 2. At an elevation convenient to the operator a work table or platform 3 is mounted on the uprights 1 and 2 in cantilever fashion. The platform is of wood or metal and may include suitable strengthening ribs 4 and diagonal or gusset members 5. Supporting members 6 and 7 are disposed in spaced relation to one another above and in parallel spaced relation to the tube supporting surface 8 of the platform 3.

The supporting members 6 and 7 constitute heaters, as will later appear, and accordingly are made of heat conducting material such as steel. Each member is reinforced as by a channel bar 9 welded to its underside, the channel bars, in turn, each being secured at one end as by welding to the top of a cross member 10 extending between the uprights 1 and 2. The metal heater plates or support members 6 and 7 and their reinforcing channel bars 9 are thus disposed in cantilever fashion over the work surface 8 of the platform 3. Annular rubber tubes A, B and C are received over free ends 11 of the heater members with portions of the tubes supported on upper surfaces 24 of the members 6 and 7 and in direct contact with the latter. The greater portion of each of the tubes A, B and C is, however, received on and supported by the surface 8 of the platform so that minimum tension exists in the tube portions which extend across the supports 6 and 7. As shown in Fig. 1 the extent of the platform surface 8 is greater than the distance between the outer edges of the support members 6 and 7 to insure adequate support of tubes received on the device for localized heating.

Heating of the tube contacting plates 6 and 7 is effected by suitable means such as electrical heating elements 12 connected through wires 14 to a source of electrical energy. The heating elements each extends the full length of the plate to which it is attached and may be secured either directly against and in heat conducting contact with the underside of the plate, or, as shown, separated from the bottom of the plate member by metal spacers 15 so as to heat the plates by conduction through the spacers and also by radiation.

In making molded inner tubes for vehicle tires by the process contemplated, a flat length or blank of tubular uncured or partially cured rubber stock indicated at 16 (Fig. 3) is assembled with a rubber inflation stem 17 which has a circular disk-like base that is bonded to one face of the tube stock 16. The term "rubber" includes not only the usual natural rubber compounds but also the synthetics, especially the butyl rubbers which are particularly suited to processing in accordance with the present method. After the inflation stem is secured to the tube stock the latter is trimmed to length while flat as by the cutter shown in Patent 2,186,286 or as by a pair of cutters 18 and 19 shown diagrammatically in Fig. 4. This trimming of excess portions 20 (Fig. 4) from the ends of the tube stock 16 provides freshly cut, tacky surfaces which are then abutted together and compressed as indicated by the arrows in Fig. 5 to form a joint or seam 21. The joining of the tube ends in this manner can be effected by means such as shown in the patent referred to. In Fig. 5, clamping blocks or plates 73 and 107 correspond to the elements of Patent 2,186,286 identified by the same numerals.

After the trimming of the tube stock 16 and the formation of the annulus by joining of the freshly cut ends, the blank is placed over the cantilever supports 6 and 7, the seam 21 being located midway between the spaced edges 22 of the heated support members. To facilitate location of the seam 21 at the halfway point between the spaced heaters, a center splice supporting bar or member 23 is provided. This support parallels the edges of the heater plates and takes the form of a narrow bar mounted as a cantilever on the cross member 10 of the supporting structure. It is disposed at substantially the same level as the tube contacting surfaces 24 of the heated support members 6 and 7.

The function of the heated supports 6 and 7 is to raise the temperature of localized portions of the tube stock to make such portion softer than the tube portion which includes the seam 21. The heated portions of the tube overlie the support plates 6 and 7 between the inner edges 22 and outer edges 35 of such plates. The temperature of the support members or plates 6 and 7 is not critical since the localized heating of selected portions of the tubes is satisfactorily obtained by either a relatively long contact with plates at a relatively low temperature or by a relatively short period of contact with heater plates at a relatively high temperature. For use in the manufacture of passenger tire inner tubes it has been found that heating elements which maintain the support plates 6 and 7 at an average temperature of approximately 150° F. are satisfactory. At this temperature the tubes A, B and C are allowed to remain in contact with the plates for a period of about 4 to 8 minutes preferably in the neighborhood of about 6 minutes. This period of time is sufficient to soften the rubber of the heated tube portions to such an extent that, when inflated in a heated mold for curing, the stretching of the tube is concentrated or more pronounced in the heated tube portions, thereby relieving the seam 21 of excessive strain and avoiding failure of the seam joint. For tubes of heavier sections, such as those employed in bus and truck tires, a longer period of preliminary heating is required or the heater plates may be maintained at a higher temperature, or both a higher temperature and a longer heating period can be used. The elevation of temperature of the rubber is sufficient to be felt as a warm sensation by the bare hand when the tube is removed from the heater, but not sufficient to cause a burn or even to feel unbearably hot. Excessive heating must be avoided to prevent rupture of the heated tube wall during inflation.

The desired localized heating of tube portions spaced from the seam 21, as described, can also be accomplished by radiation. In Fig. 7 is a diagrammatic illustration of a modification in which a portion of the annular tube blank is supported above the platform 3 by coplanar members 25, 26 and 27. These support members, mounted cantilever fashion on the supporting structure of the apparatus, are of nonheat-conducting material, wood or composition board being satisfactory. Between side edges 28 and 29 of the center member 26 and side edges 30 of the outer members 25 and 27 which parallel and confront the edges of the center member, are gaps 31 bridged by the tube portions to be heated.

Radiant heaters comprising heating elements or lamps 32 and curved reflectors 33 are suitably supported above and below the tube portions that span the gaps 31 between the support members so as to direct radiant energy uniformly onto such tube portions. The heaters are arranged in confronting pairs, one heater of each pair directing radiant heat onto the top of the tube portion and the other heater of the pair directing radiant heat onto the bottom of such tube portion.

The nonheat-conducting tube supporting members 25, 26 and 27 are preferably of sufficient length to accommodate a plurality of tubes in side by side relation similar to the manner in which the tubes A, B and C are received by the apparatus illustrated in Figs. 1 and 2. Each of the reflectors 33 is trough-like in shape extending the full length of the gap 31 with which it is associated. Although the exact cross sectional shape of the reflecting troughs is not critical, effective heating is obtained when they are parabolic, or substantially so, and the radiant heating elements or lamps 32 are supported at the focal axis of the trough. All of the radiant heaters are connected by wires and switches (not shown) to a source of electrical energy. A conventional timer is incorporated in the circuit so that both top and bottom surfaces of the selected localized portions of the tubes are subjected to radiant heat for predetermined periods of time sufficient to warm and soften the rubber. The upper heater-reflector units are mounted for vertical movement to and from the plane of tube supporting surface 34 of the horizontal supports. These radiant heaters, by suitable means, are thus raised or retracted from operating position to facilitate placement and removal of the rubber tubes. As in the process described in connection with Figs. 1 and 2 the process used with the apparatus of Fig. 7 includes the step of heating spaced circumferentially short portions of the tube on opposite sides of the butt seam 21. The radiant heat is applied only sufficiently to warm the spaced tube portions to render them relatively soft and less resistant to stretching than the other portions of the tube.

In Figs. 8 through 10 is shown a modified apparatus for effecting a preliminary cure of the seam area of the tube by localized heating. A platform 36 having a tube supporting surface 37 is mounted on a supporting structure that includes uprights 38. A vertical column 39 carried by the supporting structure carries a yoke-like assembly which is supported in cantilever fashion. The yoke includes a cross member 40 which embraces and is secured to the column and spaced parallel arms 41 and 42 which are disposed above and in parallel relation to the tube supporting surface 37 of the platform 36.

Also mounted on the column 39 in cantilever fashion is a heater assembly which is movable vertically to and from an operating station between the spaced tube supporting arms 41 and 42. The heater assembly comprises a tubular slide 44 and a metal heater bar or arm 45 which extends laterally from the sleeve as a cantilever. Along its opposite edges the upper face of the heater bar is rabbeted as indicated at 46 to receive the edges of tube contacting members 47 formed of nonheat-conducting material such as asbestos board. The members 47 are also supported by metal plates 48. These plates are mounted as by spacers 49 on a plate 50 secured at one end to the slide 44 for cantilever support by the latter. Diagonal struts or braces 51 are secured to the underside of the plate 50 and to the slide 44 and extend across the angle between these components of the assembly.

A key or guide rib 52 recessed in the column 39 slides in a keyway formed in the slider 44 to prevent turning of the latter on the column thereby retaining the cantilever components of the heater assembly in parallel relation to the work arms 41 and 42. The underside of the heater bar 45 is recessed to accommodate an electrical resistance heating element 54 supported along the center of the plate 50, preferably being insulated from the plate as by pad or pads 55. Conductor wires 56 (Fig. 8) from the heating element 54 are connected through conventional switching means to a source of electrical energy.

A tube or tubes, made into annular form as described in connection with Figs. 3 through 5, are placed over the fork arms 41 and 42 with the sliding heater assembly in the retracted position shown in Fig. 9. The heater assembly is then raised to operative position, indicated by the broken lines of Fig. 9, as by means of a piston and cylinder assembly 57 connected to the heater bar 45 as by a vertical rod 58. The piston assembly is mounted on a cross member or members 59 of the supporting structure and is connected to an air pressure source by conventional valves and time control mechanism arranged to hold the heater assembly in operative position for a predetermined time interval. A relatively narrow upper surface 60 of the heater bar 45 engages the underside of the tube 16 along the seam line 21, as shown in Fig. 10. The heat imparted to the rubber of the tube at and adjacent the seam line has the effect of initiating the cure of or partial curing of such rubber so that the seam bond is improved and made stronger. When the inner tube is removed from the preheating apparatus it is allowed to cool and is then placed in a heated mold for curing. The seam 21, by reason of the partial preliminary cure to which the rubber adjacent the seam has been subject, is relatively stronger and better able to withstand the tension to which it is subjected upon inflation of the tube while in the curing mold.

Precuring of a circumferentially short portion of the tube at and adjacent the seam 21 can also be accomplished by a modification of the apparatus of Figs. 8 through 10 wherein a radiant heater or pair of heaters take the place of the heater bar 45. Such a modification is illustrated diagrammatically in Fig. 11 wherein an upper radiant heater element 63 and a trough-like parabolic reflector 64 are mounted cantilever fashion as by means of the yoke across member 40 previously described, and a lower radiant heating element 65 and its parabolic reflector 66 are mounted cantilever fashion as by means of the previously described slide 44. The upper and lower heaters are thus disposed in confronting relation on opposite sides of the narrow gap 67 provided between spaced parallel edges 68 of the nonheat-conducting tube supporting members 47.

In the operation of the apparatus illustrated in Fig. 11 the elongated radiant heaters 63 and 65 are connected to an electrical energy source through a timing device which may be the same as that controlling the air cylinder assembly 57. By this arrangement the radiant heaters are energized automatically when moved toward one another to embrace the short seam containing section of the rubber tube and are de-energized automatically when the slide 44 is retracted and the heaters are drawn apart for removal of the inner tube or tubes from the fork arms 41 and 42.

Although the process improvement carried out through the use of the apparatuses of Figs. 8 through 11 comprises a preliminary heating of a localized circumferentially relatively short portion of each inner tube, it is distinguished from the process as carried out in connection with the apparatuses of Fig. 1 and 2 and Fig. 7 in that one process contemplates a curing of the rubber, or a partial cure, whereas the other process includes only sufficient heating or warming of the tube stock to effect a softening thereof. When the warmed tube (as distinguished from the partially cured tube) is inflated in the curing mold, sufficient stretching occurs in the softened portion or portions of the tube to relieve the seam 21 of stress. In the process step contemplated in connection with the apparatus of Figs. 8 through 11, however, the localized preliminary heating of the tube or tubes is continued for a longer period of time or at a higher temperature sufficient to effect a partial cure of the rubber at the seam. It has been found, for example, that an adequate partial or precure of the rubber at the seam can be effected by subjecting it, in the manner described, to the heat of the bar 45 for a period of 1 or 2 minutes, preferably in the neighborhood of about 1½ minutes with the bar at a temperature of approximately 350° F. The partially cured rubber is allowed to cool before placing the tube in the mold for completion of the cure.

In accordance with patent statutes the principles of the present invention may be utilized in various ways, numerous modifications and alterations being contemplated, substitution of parts and changes in construction being resorted to as desired, it being understood that the article and apparatus shown in the drawings and described above and the particular method set forth are given merely for purposes of explanation and illustration without intending to limit the scope of the claims to the specific details disclosed.

What I claim and desire to secure by Letters Patent of the United States is:

1. An apparatus for localized heating of a rubber annulus adjacent the spliced portion thereof comprising a supporting structure, a horizontal platform carried by the supporting structure, a pair of spaced-apart, horizontal heater bars carried by the supporting structure in generally spaced parallel relation to and above the platform, a splice supporting element intermediate and substantially coplanar with said heater bars, an electric heating element disposed beneath and in a heat exchanging relation to each heater bar, the heater bars and splice supporting element being supported in cantilever fashion to receive a rubber annulus over each end thereof so that the annulus may be positioned with two spaced portions of the annulus on the heater bars, the spliced portion of the annulus on the spliced supporting element and another portion of the annulus resting on the platform below the heater bar.

2. An apparatus for localized heating of rubber inner tubes in the area adjacent but not at the splice comprising a supporting structure, a pair of spaced, horizontally disposed supporting members each secured at one end to the structure and extending from the latter in cantilever fashion, a splice supporting member intermediate and coplanar with said supporting members, radiant heating means generally paralleling the supporting members and disposed to heat that portion of the tube located across the space separating the supporting members and intermediate splice supporting member, means mounting the heating means on the supporting structure in cantilever fashion, said last named mounting means including means for raising and lowering the heating means relative to the supporting members and for moving the heating means into and out of engagement with an inner tube suspended across the supporting member.

3. An apparatus for localized heating of a rubber annulus adjacent the splice thereof comprising a supporting structure, a horizontal platform carried by the supporting structure, a pair of spaced-apart, horizontal heater bars carried by the supporting structure in generally spaced parallel relation to and above the platform, an electrical heating element disposed beneath and in heat exchanging relation to each heater bar, a splice supporting bar intermediate said heater bars, the heater bars and splice supporting bar being supported in cantilever fashion to receive a rubber annulus over one end so that the annulus may be positioned with two spaced portions of the annulus resting on the heater bars, the splice resting on the splice supporting bar, and another portion of the annulus resting on the platform below the heater bars.

References Cited in the file of this patent

UNITED STATES PATENTS

| Number | Name | Date |
|---|---|---|
| 1,262,342 | Hohl | Apr. 9, 1918 |
| 1,539,828 | Campbell | June 2, 1925 |
| 1,548,847 | Metcalf | Aug. 11, 1925 |
| 1,653,621 | Cross | Dec. 27, 1927 |
| 1,693,636 | Coe | Dec. 4, 1928 |
| 1,905,365 | Carlin | Apr. 25, 1933 |
| 2,113,770 | Richardson | Apr. 12, 1938 |
| 2,272,965 | Crowley | Feb. 10, 1942 |
| 2,438,498 | Geist, Sr. et al. | Mar. 30, 1948 |
| 2,504,460 | Slatkin | Apr. 18, 1950 |
| 2,609,481 | Hacklander | Sept. 2, 1952 |
| 2,641,304 | Biddinger et al. | June 9, 1953 |